(12) United States Patent
Penick et al.

(10) Patent No.: US 6,763,483 B2
(45) Date of Patent: Jul. 13, 2004

(54) METHOD OF OPTIMIZING THE USE OF RADIO DEVICES IN A COMPUTING SYSTEM

(75) Inventors: Matthew W. Penick, Round Rock, TX (US); Liam B. Quinn, Austin, TX (US); Luc D. Truong, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 601 days.

(21) Appl. No.: 09/771,101

(22) Filed: Jan. 26, 2001

(65) Prior Publication Data

US 2002/0104044 A1 Aug. 1, 2002

(51) Int. Cl.[7] .................................................. H02H 3/05
(52) U.S. Cl. ................................... 714/39; 370/310.1
(58) Field of Search ............................. 714/39, 47, 25; 370/241, 242, 310, 310.1

(56) References Cited

U.S. PATENT DOCUMENTS

| | | | | |
|---|---|---|---|---|
| 4,903,333 A | * | 2/1990 | Aizawa | ....................... 455/269 |
| 5,461,639 A | * | 10/1995 | Wheatley et al. | ............ 370/342 |
| 5,485,486 A | * | 1/1996 | Gilhousen et al. | ........... 370/335 |
| 5,732,328 A | * | 3/1998 | Mitra et al. | .................... 455/69 |
| 5,983,353 A | | 11/1999 | McHann, Jr. | ................ 713/310 |
| 6,058,106 A | * | 5/2000 | Cudak et al. | ................ 370/313 |
| 6,366,572 B1 | * | 4/2002 | Esterberg et al. | ............ 370/343 |

* cited by examiner

Primary Examiner—Dieu-Minh Le
(74) Attorney, Agent, or Firm—Haynes and Boone, LLP

(57) ABSTRACT

A method for optimizing the use of wireless peripheral devices if described. The optimization is achieved by monitoring the signal integrity of each wireless device operating within the computer system. When the signal integrity of a wireless device degrades due to the interference from other wireless devices operating within the computing system, beyond certain predefined optimal range, the communication parameters of each wireless peripheral devices are adjusted reiteratively to obtain the most efficient configuration for optimal throughput and optimal energy efficiency for each wireless peripheral device. The configuration constantly changes within the environment based on the interference from internal and external wireless devices.

21 Claims, 5 Drawing Sheets

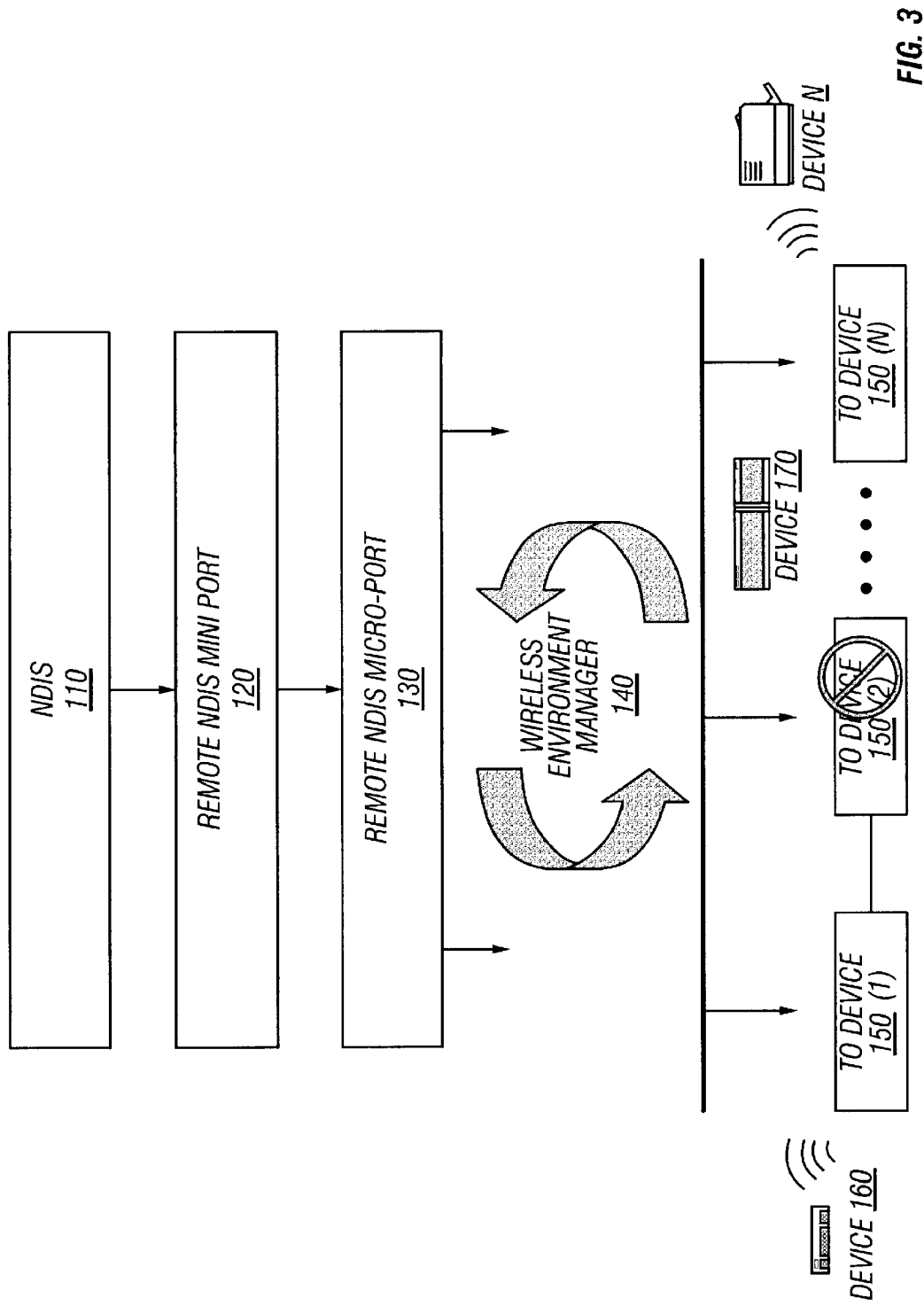

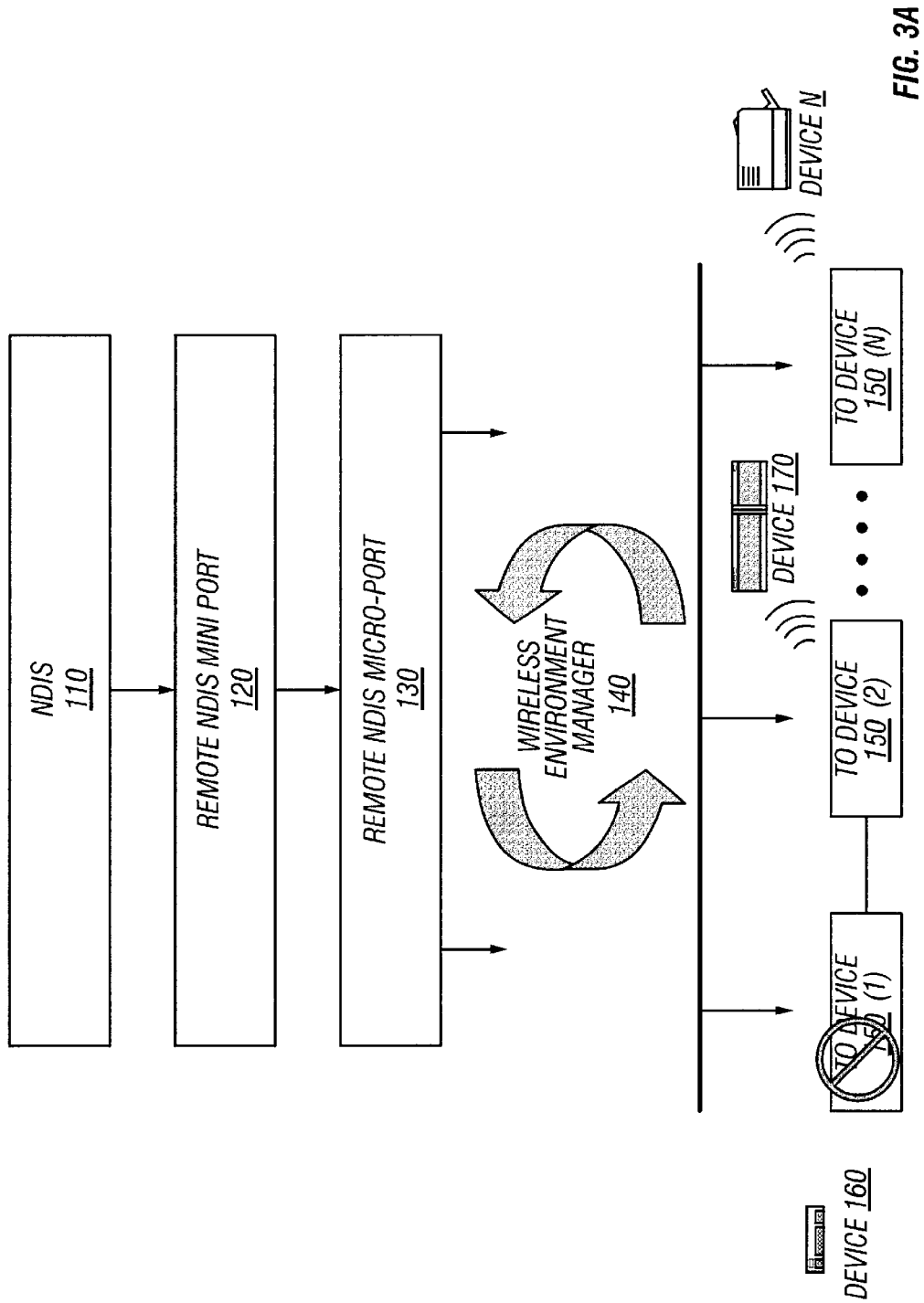

METHOD OF OPTIMIZING THE USE OF RADIO DEVICES IN A COMPUTING SYSTEM

BACKGROUND

This disclosure relates generally to computing systems with wireless radio devices and more particularly to mobile computing systems with wireless peripheral devices for data processing.

DESCRIPTION OF THE RELATED ART

Computing systems generally have a variety of wireless device interfaces with multiple technological standards to provide services to wireless peripheral devices. Wireless devices operate in certain defined frequency spectrum. However, recently the gap between multiple operational frequency spectrums has narrowed and the devices operating in these spectrums often interfere with each other's communication channels. In some cases, the operational frequencies of different wireless communication standards overlap with each other making it difficult to operate devices in the same frequency spectrum. For example, the Bluetooth and the wireless IEEE 802.11 devices operate in the same 2.4 Giga Hertz frequency range. When a computing system communicates with a wireless device with Bluetooth technology and another wireless device with IEEE 802.11 standard is operating nearby or is trying to establish a communication channel with the computing system, then this may cause performance or system interference with other communication channels in the competing system. In such case, either the quality of transmission and reception of the devices will be degraded or the communication connection will be dropped due to a high error rate.

Similar problems arise when a mobile computing systems operates in an environment in which multiple radio frequency devices are operating such as microwave oven, wireless phones and like. The radio frequency interference increases the transmission and reception error rates and may cause the computing system to drop the communication connection thus affecting the data processing.

The operating systems on computing systems communicate with wireless peripheral devices through each device's Network Interface Cards (NIC) which conforms to e.g. the Network Driver Interface Specification (NDIS). NDIS provides a standard interface to computing systems irrespective of underlying technology of NIC. The wireless devices connect to computing systems and computing systems communicate with wireless peripheral devices using device specific NIC. Each individual NIC controls its wireless environment for communication. The computing system is not directly involved in the control of wireless device. When wireless peripheral on multiple incompatible technologies attempt to communicate with the computing system, the radio interference from each device increase the error rate of communication. When the error rate exceeds certain acceptable level then either the computing system or the device interface NIC terminates the connection. In an environment where there is a heavy use of wireless devices such as wireless phones, wireless network adapters, microwave ovens, wireless personal communication devices and like, it is difficult to maintain a continuous wireless connection with an acceptable error rate. The computing systems have to choose the most powerful signal with acceptable error rate to communicate with and drop the low power, high error rate signals. In such environment, a device with high communication error rate may never be able to make and maintain a connection with the computing system for a longer period of time.

SUMMARY

The present disclosure relates to a method to control the parameters of wireless device interface such as power, gain, frequency, bandwidth and other parameters in a computing system. In one embodiment, the present disclosure provides control over multiple wireless device interfaces and monitors the error rate and the quality of communication of these devices. In case of a conflict or interference, the power, gain and bandwidth of devices is adjusted to create an optimal working environment for multiple wireless devices. It is ensured that each wireless device operate within its optimal range and in case of an unresolved conflict between devices, a priority scheme is utilized to ensure the integrity of critical wireless communication data.

The foregoing is a Summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and it's numerous objects, features, and advantages made apparent to those skilled in the art by referencing the accompanying drawings.

FIG. 3 illustrates an example of power toggling by Wireless Environment Manager between multiple wireless devices.

FIG. 3A illustrates another example of power toggling.

The use of the same reference symbols in different drawings indicates similar or identical items.

DETAILED DESCRIPTION

The following is intended to provide a detailed description of an example of the disclosure and should not be taken to be limiting of the invention itself. Rather, any number of variations may fall within the scope of the disclosure, which is defined in the claims following the description.

System Functionality

Figure 1:
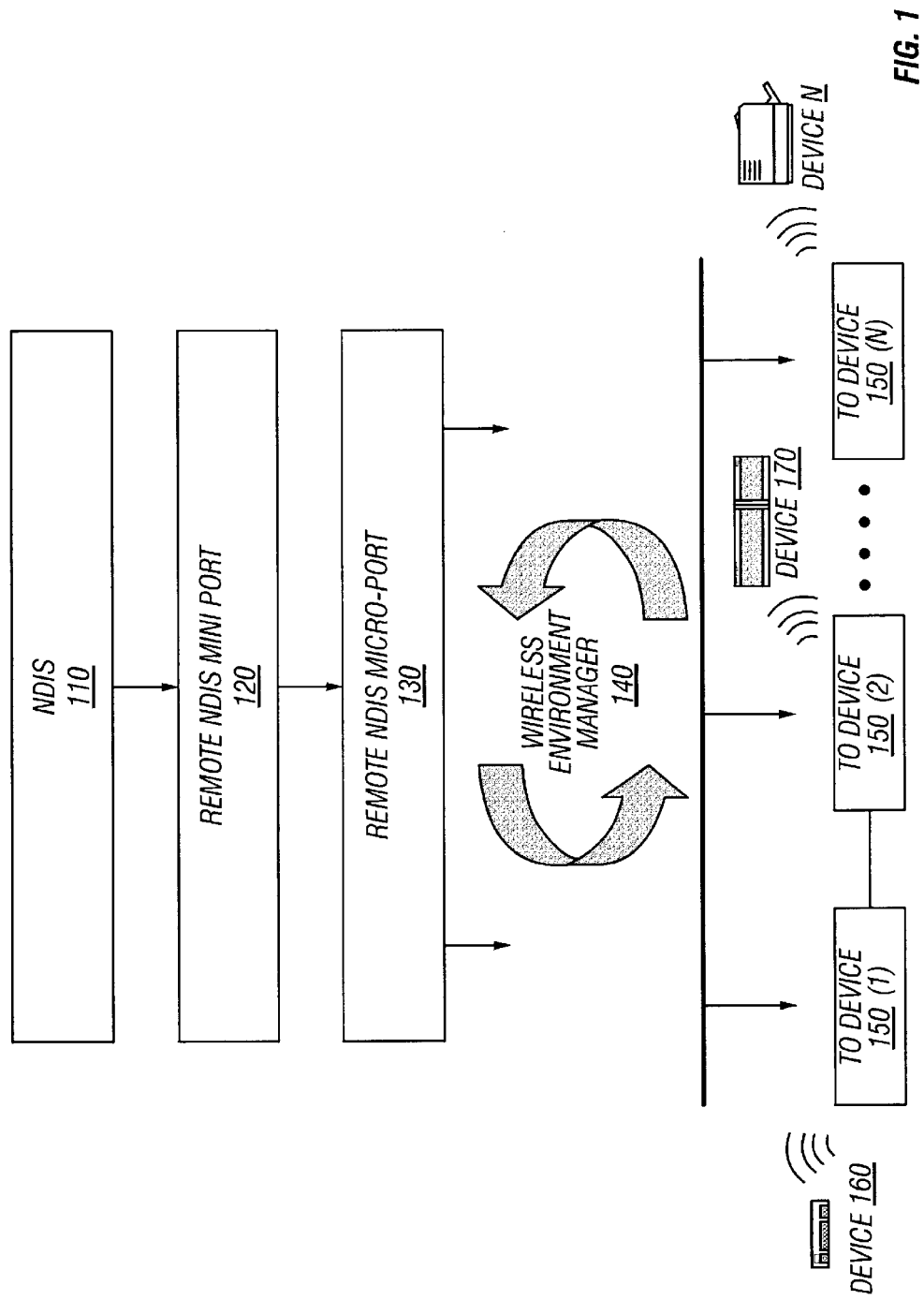
FIG. 1 illustrates an example of a system architecture according to an embodiment of present invention
Figure 2:
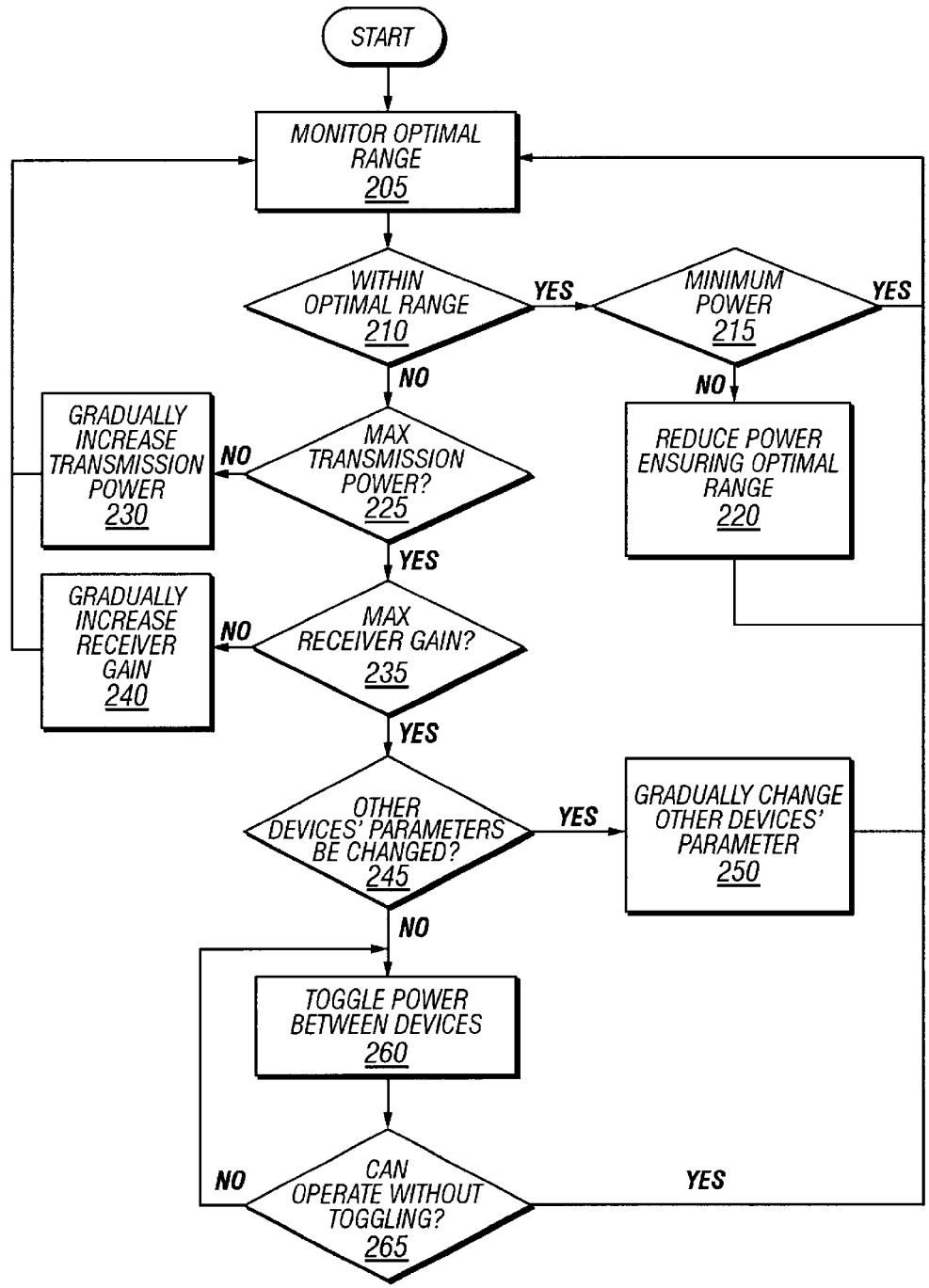
FIG. 2 illustrates an example of steps performed by Wireless Environment Manager to optimize multi-functioning of wireless devices in an environment.

FIG. 2 illustrates an example of steps performed by WEM 140 to optimize multi-functioning of wireless devices. For illustration purpose, wireless device interface 150(1) is used to describe the functioning of WEM 140. WEM 140 continuously monitors the signal strength of the wireless devices to determine if the signal strengths are within a defined optimal range. The optimal range is defined based on the system and communication requirements. In one embodiment, the optimal range includes communication error rate and the signal strengths of wireless devices. The optimal range is a predetermined acceptable range of signal strength and communication error rate. Based on the overall resource processing, the computing system can also dynamically calculate the acceptable error rate and the signal strength. The value of optimal range is chosen such as to ensure an optimal wireless environment in which multiple devices can function with minimum or no interference and provide an effective communication throughput. Other parameters such as the operating frequency, bandwidth span and like can also be used to determine an optimal functioning range of wireless devices.

If the WEM 140 determines that the device 160 is functioning within the optimal range (210), then the WEM 140 checks that the device 160 is not using extra power to operate in the optimal range (215). This check is done to ensure that in a non-interfering wireless environment, a wireless device is not using more power than the device would need to operate within the optimal range. If the device 160 is using minimum power within the optimal range, then WEM 140 continues to monitor wireless devices' communication efficiency. If the device 160 is using more power, the WEM 140 reduces device 160's power (220) to a level at which the device 160 can operate in the optimal range. The reduction of power for device 160 preserves power for the computing system and also reduces the strength device 160's radio signal to a level at which the device 160 can function within the optimal range and not produce interference for other wireless devices operating in the same environment.

If the device 160 is not operating in the optimal range, i.e., the communication error rate has increased to a level that degrades the signal integrity, then WEM 140 checks whether the device 160 is using maximum transmission power available (225). If the device is not using the maximum transmission power available, then the WEM 140 gradually increases device 160's transmission power to increase the signal strength (230). The gradual increase in power is continued until either the optimal signal strength is achieved or the maximum power level of the device is reached. If the device 160 is at the maximum power level available, then the WEM 140 checks if the receiver gain can be increased to boost signal detection (235). If the receiver gain can be increased, then the WEM 140 gradually increases device 160's receiver gain (240). The transmission power and receiver gain of device 160 are adjusted repeatedly until a balanced optimal range is obtained within the maximum transmission power and receiver gain limits of the device 160.

If the device 160 is already using maximum transmission power and receiver gain, then WEM 140 checks the parameters of other wireless devices to determine whether the parameters of those devices can be adjusted (245). The parameters of other devices typically include transmission power, receiver gain, operating frequency, bandwidth spectrum and any other operation and functional parameter that impacts the signal strength. The adjustment of parameter include for example, reducing or increasing the transmission power, reducing or increasing the receiver gain, switching the communication frequency, adjusting the bandwidth spectrum and like (245). If the parameters of other devices can be adjusted without affecting their optimal range, the WEM 140 adjusts the parameters of those devices (250). The parameters of other devices are adjusted to a level at which the device 160 can function within optimal range and other device's optimal range is also not affected. This is done iteratively until an optimal balanced working range is obtained for all the devices. After a few iterations, the WEM 140 reaches a most efficient configuration for optimal throughput, transmission power and receiver gain for each device. This cycle is repeated every time the wireless environment of the computing system changes. This cycling of parameter adjustment is possible in an environment in which the signal interference is generated by one of the devices within WEM 140's control and can be controlled by adjusting device parameter.

The computing system can be situated in an environment where the interference to wireless communication is generated by other external devices which are not within the WEM 140 control. An example of external devices can be a microwave oven, wireless phone, other computing system with similar wireless device interfaces and like. If the signal integrity of device 160 is degrading even after the parameter adjustment cycling, then the WEM 140 initiates a transmission power toggling routine (260).

The WEM 140 reduces the transmission power of one of the devices to increase the signal strength of device 160. The reduction in transmission power of the other device may bring that device's signal strength below that device's optimal range. If the signal strength of device 160 does not improve, the WEM 140 suspends the power to the other devices. This is done to ensure that at least one device is able to communicate with the computing system within that device's optimal range. The WEM 140 reduces the transmission power of device 160, below the optimal range of device 160, and increase the power of other device to allow that device to communicate with the computing system. The toggling of transmission power between various wireless devices allows each device to maintain a seamless connection with the computing system. During the toggling of the transmission power, the WEM 140 continues to check if the devices can operate in the optimal range without the transmission power toggling (265). When the external radio interference reduces, the WEM 140 brings all the devices back to their optimal range using aforementioned parameter adjustment cycling.

FIG. 3 illustrates an example of power toggling between multiple devices. To provide a maximum power for device 160, the WEM 140 suspends the power to device 170 and reduces the power to device N. The power suspension time period of device 170 is equal to device 170's communication delay period. This minimizes the communication interference for device 170 and maintains the data integrity. The power of device N is reduced to a level at which the device N can function within an acceptable error rate. Thus allowing device 160 to continue the communication with the computing system.

Figure 3B:
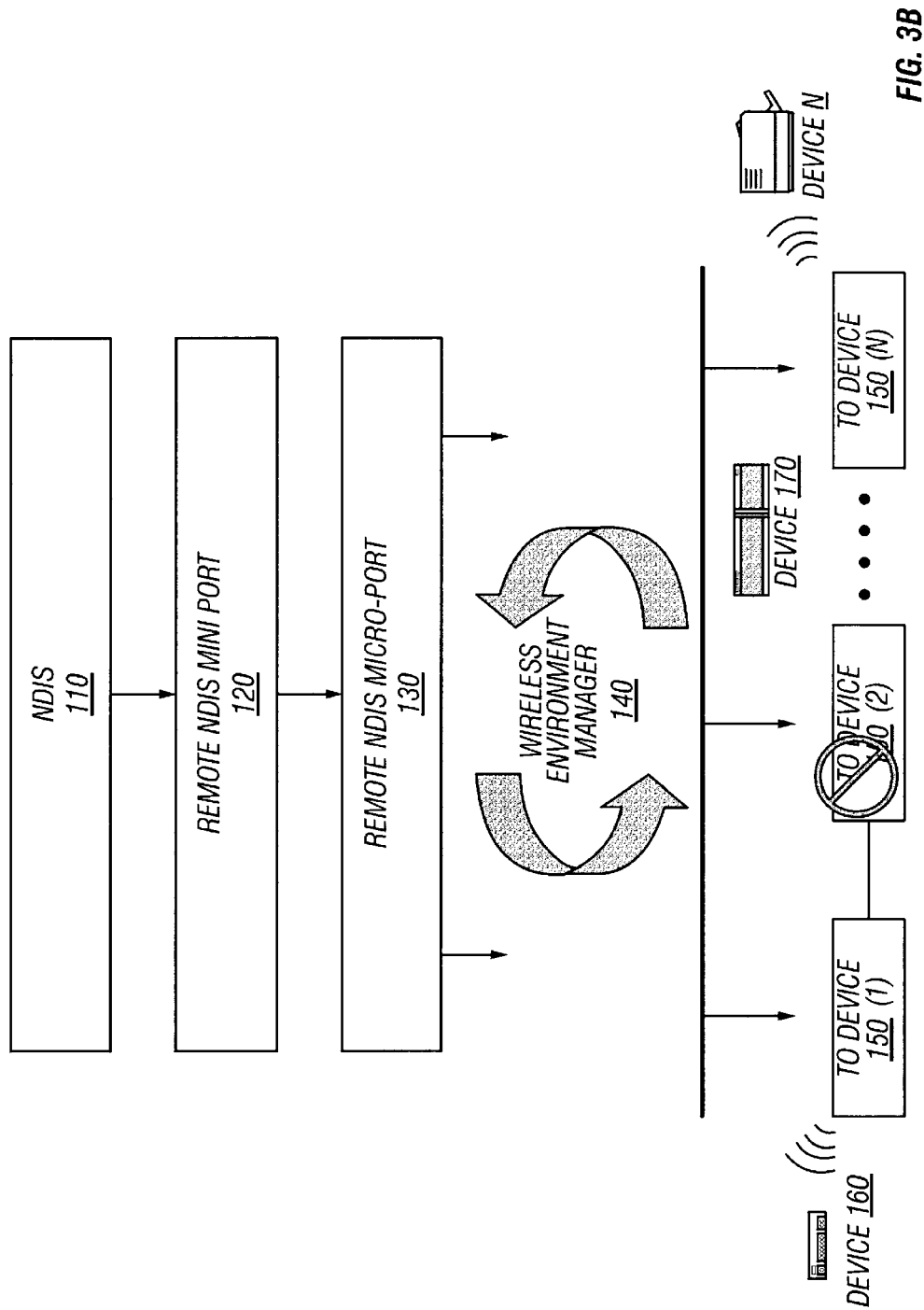
FIG. 3B illustrates another example of power toggling.

FIG. 3A illustrates another example of power toggling by WEM 140. To provide maximum power to device 170, the WEM 140 suspends the power to device 160 while keeping the power to device N at a minimum level. Another example is illustrated in FIG. 3B where the power to device 170 is suspended to allow device N to communicate with full power while keeping the power of device 160 at a minimum level. The toggling of power between the devices is done based on the analysis of communication error rate of each device.

As mentioned above, the optimal range of communication can also be obtained by toggling the functional frequencies and bandwidth spectrums of each device depending upon underlying physical architecture. While particular embodiments of the present disclosure have been shown and described, it will be obvious to those skilled in the art that, based upon the teachings herein, changes and modifications may be made without departing from this disclosure and its broader aspects and, therefore, the appended claims are to encompass within their scope all such changes and modifications as are within the true spirit and scope of this disclosure. Furthermore, it is to be understood that the invention is solely defined by the appended claims.

What is claimed is:

1. A method of optimizing multi-functioning of a plurality of wireless peripheral devices in a computer system, the computer system comprising, a processor, a plurality of processor peripherals, a plurality of peripheral devices coupled to the computer system, and a plurality of wireless peripheral devices, the method comprising:

monitoring strength of a signal of the plurality of wireless peripheral devices;

detecting the strength of the signal falling below an optimal range of at least one of the plurality of wireless peripheral devices;

determining whether the transmission power may be increased to achieve a signal strength closer to the optimal range and, in response to being able to achieve a signal strength closer to the optimal range, increasing the transmission power;

determining whether the receiver gain may be increased to achieve a signal strength closer to the optimal range and, in response to being able to achieve a signal strength closer to the optimal range, increasing the receiver gain; and determining whether any other device parameters may be adjusted to achieve a signal strength closer to the optimal range and, in response to being able to achieve a signal strength closer to the optimal range, adjusting the other device parameters.

2. The method of claim 1, wherein:

the optimal range is either defined manually or dynamically calculated by the computer system; and at least some of the plurality of wireless peripheral devices conform to a plurality of incompatible wireless technologies.

3. The method of claim 2, further comprising:

when the signals of the plurality of wireless peripheral devices are within the optimal range,
determining whether the plurality of wireless peripheral devices are using extra transmission power, and reducing the transmission power of the plurality of wireless peripheral devices to achieve a minimum power use within the optimal range.

4. The method of claim 3, further comprising:

when the strength of the signal of a first one of the plurality of wireless peripheral devices is not within the optimal range,
i. determining whether the transmission power of the first one of the plurality of wireless peripheral devices is at a maximum transmission power level, and if the transmission power of the first one of the plurality of wireless peripheral devices is not at a maximum transmission power level, then increasing the transmission power of the first one of the plurality of wireless peripheral devices, and
ii. if the signal strength of the first one of the plurality of wireless peripheral devices is not within the optimal range, then repeating step (i).

5. The method of claim 4, further comprising:

when the strength of the signal of a first one of the plurality of wireless peripheral devices is not within the optimal range,
i. determining whether the receiver gain of the first one of the plurality of wireless peripheral devices is at a maximum receiver gain level, and if the receiver gain of the first one of the plurality of wireless peripheral devices is not at a maximum receiver gain level, then increasing the receiver gain of the first one of the plurality of wireless peripheral devices, and
ii. if the signal strength of the first one of the plurality of wireless peripheral devices is not within the optimal range, then repeating step (i).

6. The method of claim 5, further comprising:

if the signal of the first one of the plurality of wireless peripheral devices is not within the optimal range, selecting another one of the plurality of wireless peripheral devices,
i. adjusting at least one of the plurality of operational parameters of the selected one of the plurality of wireless peripheral devices,
ii. monitoring the strength of the signal of the plurality of wireless peripheral devices,
iii. if the strength of the signal of the plurality of wireless peripheral devices is not within the optimal range, then selecting another one of the plurality of wireless peripheral devices, and repeationg steps (i)–(ii).

7. The method of claim 6, further comprising:

if the strength of the signal of the plurality of wireless peripheral devices is not within the optimal range, selecting one of the plurality of wireless peripheral devices,
i. suspending the transmission power to the selected device,
ii. waiting for a transmission delay time interval of the selected device,
iii. resuming the transmission power to the selected device,
iv. monitoring the strength of the signal of the plurality of the wireless peripheral devices,
v. if the strength of the signal of the plurality of the wireless peripheral devices is not within the optimal range, then selecting another one of the plurality of the wireless peripheral devices, and repeating steps (i)–(iv).

8. A computer program product for optimizing multi-functioning of a plurality of wireless peripheral devices in a computer system, the computer system comprising, a processor, a plurality of processor peripherals, a plurality of peripheral devices coupled to the computer system, and a plurality of wireless peripheral devices, the method comprising:

a first set of instructions executable on the computer system, configured to monitor strength of a signal of the plurality of wireless peripheral devices;

a second set of instructions executable on the computer system, configured to detect the strength of the signal falling below an optimal range of at least one of the plurality of wireless peripheral devices;

a third set of instructions executable on the computer system, configured to determine whether the transmission power may be increased to achieve a signal strength closer to the optimal range and, in response to being able to achieve a signal strength closer to the optimal range, increasing the transmission power;

a fourth set of instructions executable on the computer system, configured to determine whether the receiver gain may be increased to achieve a signal strength closer to the optimal range and, in response to being able to achieve a signal strength closer to the optimal range, increasing the receiver gain; and a fifth set of instructions executable on the computer system, configured to determine whether any other device parameters may be adjusted to achieve a signal strength closer to the optimal range and, in response to being able to achieve a signal strength closer to the optimal range, adjusting the other device parameters.

9. The computer program product of claim 8, wherein:

the optimal range is either defined manually or dynamically calculated by the computer system; and at least some of the plurality of wireless peripheral devices conform to a plurality of incompatible wireless technologies.

10. The computer program product of claim 9, further comprising:

a sixth set of instructions executable on the computer system, configured to, when the signals of the plurality of wireless peripheral devices are within the optimal range,
determine whether the plurality of wireless peripheral devices are using extra transmission power, and
reduce the transmission power of the plurality of wireless peripheral devices to achieve a minimum power use within the optimal range.

11. The computer program product of claim 10, further comprising:

a seventh set of instructions executable on the computer system, configured to, when the strength of the signal of a first one of the plurality of wireless peripheral devices is not within the optimal range,
i. determine whether the transmission power of the first one of the plurality of wireless peripheral devices is at a maximum transmission power level, and if the transmission power of the first one of the plurality of wireless peripheral devices is not at a maximum transmission power level, then increase the transmission power of the first one of the plurality of wireless peripheral devices, and
ii. if the signal strength of the first one of the plurality of wireless peripheral devices is not within the optimal range, then repeat step (i).

12. The computer program product of claim 11, further comprising:

a eighth set of instructions executable on the computer system, configured to, when the strength of the signal of the first one of the plurality of wireless peripheral devices is not within the optimal range,
i. determine whether the receiver gain of them first one of the plurality of wireless peripheral devices is at a maximum receiver gain level, and if the receiver gain of the first one of the plurality of wireless peripheral devices is not at a maximum receiver gain level, then increase the receiver gain of the first one of the plurality of wireless peripheral devices,
ii. if the signal strength of the first one of the plurality of wireless peripheral devices is not within the optimal range, then repeat step (i).

13. The computer program product of claim 12, further comprising:

an ninth set of instructions executable on the computer system, configured to, if the signal of the first one of the plurality of wireless peripheral devices is not within the optimal range, select another one of the plurality of wireless peripheral devices, i. adjust at least one of the plurality of operational parameters of the selected one of the plurality of wireless peripheral devices,
ii. monitor the strength of the signal of the plurality of wireless peripheral devices,
iii. if the strength of the signal of the plurality of wireless peripheral devices is not within the optimal range, then select another one of the plurality of wireless peripheral devices, and repeat steps (i)–(ii).

14. The computer program product of claim 13, further comprising:

a tenth set of instructions executable on the computer system, configured to, if the strength of the signal of the plurality of wireless peripheral devices is not within the optimal range, select one of the plurality of wireless peripheral devices,
i. suspend the transmission power to the selected device,
ii. wait for a transmission delay time interval of the selected device,
iii. resume the transmission power to the selected device,
iv. monitor the strength of the signal of the plurality of the wireless peripheral devices,
v. if the strength of the signal of the plurality of the wireless peripheral devices is not within the optimal range, then select another one of the plurality of the wireless peripheral devices, and repeat steps (i)–(iv).

15. A computer system, the computer system comprising:

a processor;

a plurality of processor peripherals;

a plurality of peripheral devices coupled to the computer system;

a plurality of wireless peripheral devices;

means for monitoring strength of a signal of the plurality of wireless peripheral devices;

means for detecting the strength of the signal falling below an optimal range of at least one of the plurality of wireless peripheral devices;

means for determining whether the transmission power may be increased to achieve a signal strength closer to the optimal range and, in response to being able to achieve a signal strength closer to the optimal range, increasing the transmission power;

means for determining whether the receiver gain may be increased to achieve a signal strength closer to the optimal range and, in response to being able to achieve a signal strength closer to the optimal range, increasing the receiver gain;

means for determining whether any other device parameters may be adjusted to achieve a signal strength closer to the optimal range and, in response to being able to achieve a signal strength closer to the optimal range, adjusting the other device parameters; and means for determining that an optimal range cannot be reached and, in response to an optimal range not being able to be reached, providing substantial power to only one of the devices until it has substantially transmitted its signal.

16. The computer system of claim 15, wherein:

the optimal range is either defined manually or dynamically calculated by the computer system; and at least some of the plurality of wireless peripheral devices conform to a plurality of incompatible wireless technologies.

17. The computer system of claim 16, further comprising:

means, when the signals of the plurality of wireless peripheral devices is within the optimal range, for determining whether the plurality of wireless peripheral devices are using extra transmission power, and reducing the transmission power of the plurality of wireless peripheral devices to achieve a minimum power use within the optimal range.

18. The computing system of claim 17, further comprising:

means, when the strength of the signal of a first one of the plurality of wireless peripheral devices is not within the optimal range, for
   i. determining whether the transmission power of the first one of the plurality of wireless peripheral devices is at a maximum transmission power level, and if the transmission power of the first one of the plurality of wireless peripheral devices is not at a maximum transmission power level, then increasing the transmission power of the first one of the plurality of wireless peripheral devices;
   ii. if the signal strength of the first one of the plurality of wireless peripheral devices is not within the optimal range, then repeating step (i).

19. The computer system of claim 18, further comprising:

means, when the strength of the signal of the first one of the plurality of wireless peripheral devices is not within the optimal range, for
   i. determining whether the receiver gain of the first one of the plurality of wireless peripheral devices is at a maximum receiver gain level, and if the receiver gain of the first one of the plurality of wireless peripheral devices is not at a maximum receiver gain level, then increasing the receiver gain of the first one of the plurality of wireless peripheral devices, and
   ii. if the signal strength of the first one of the plurality of wireless peripheral devices is not within the optimal range, then repeating step (i).

20. The computer system of claim 19, further comprising:

means, if the signal of the first one of the plurality of wireless peripheral devices is not within the optimal range, for selecting one of the plurality of wireless peripheral devices,
   i. adjusting at least one of the plurality of operational parameters of the selected one of the plurality of wireless peripheral devices,
   ii. monitoring the strength of the signal of the plurality of wireless peripheral devices,
   iii. if the strength of the signal of the plurality of wireless peripheral devices is not within the optimal range, then selecting another one of the plurality of wireless peripheral devices, and repeating steps (i)–(ii).

21. The computer system of claim 20, further comprising:

means, if the strength of the signal of the plurality of wireless peripheral devices is not within the optimal range, for selecting a device from the plurality of wireless peripheral devices,
   i. suspending the transmission power to the selected device,
   ii. waiting for a transmission delay time interval of the selected device,
   iii. resuming the transmission power to the selected device,
   iv. monitoring the strength of the signal of the plurality of the wireless peripheral devices,
   v. if the strength of the signal of the plurality of the wireless peripheral devices is not within the optimal range, then selecting another device from the plurality of the wireless peripheral devices, and repeating steps (i)–(iv).

* * * * *